Sept. 27, 1949.　　　　P. G. THOMAS　　　　2,483,328
SCREW ADJUSTMENT COMPARATOR
Filed Nov. 13, 1943　　　　　　　　　　　5 Sheets-Sheet 1
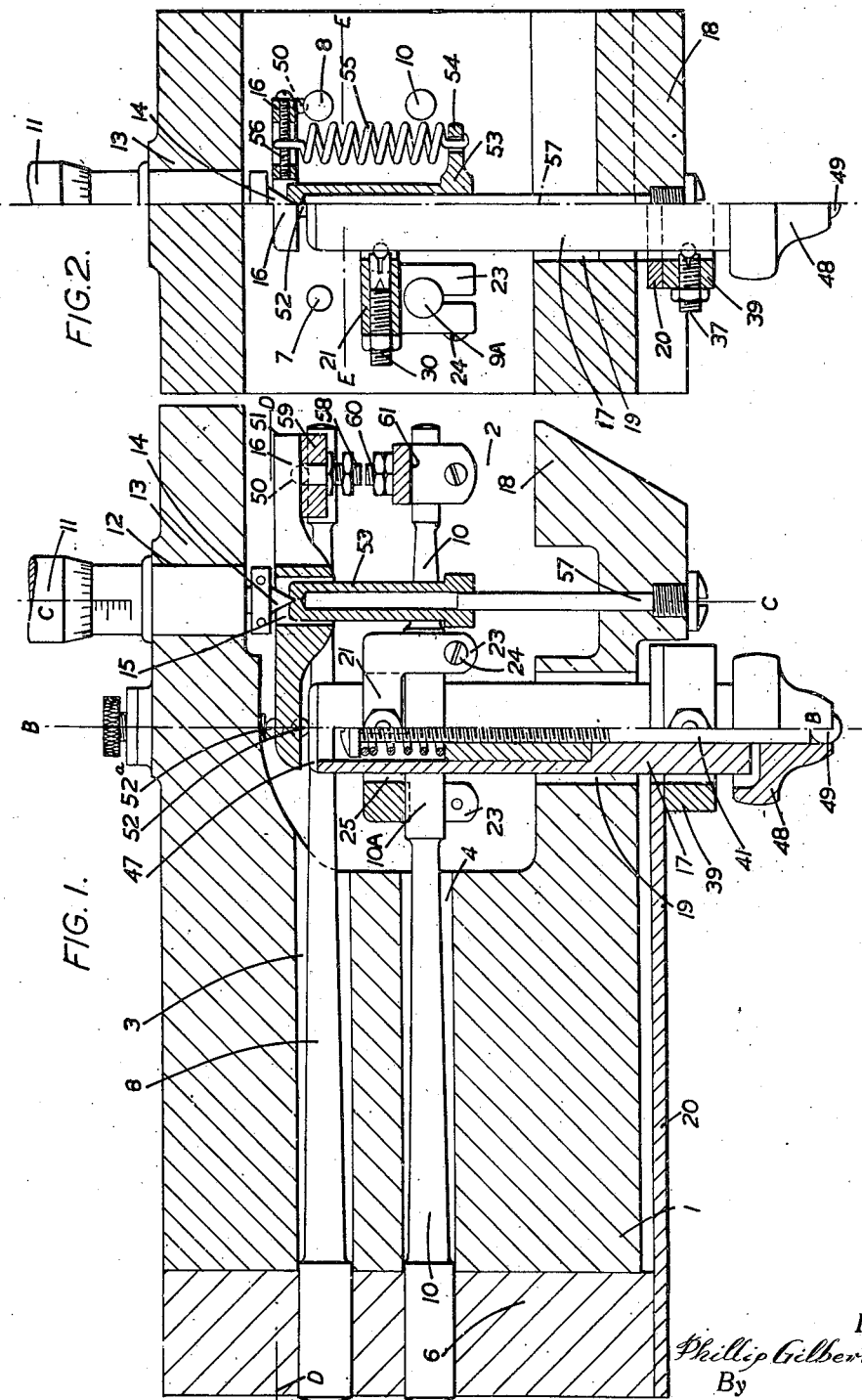
Inventor
Phillip Gilbert Thomas
By
Williams, Bradbury & Hinkle
Attorneys

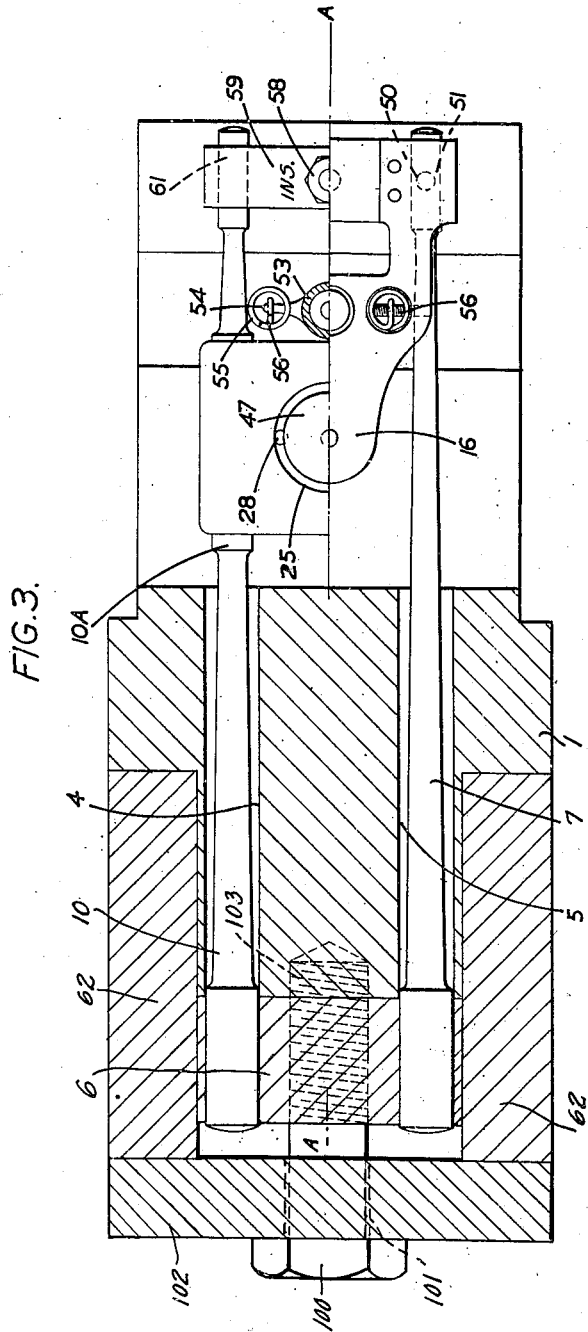

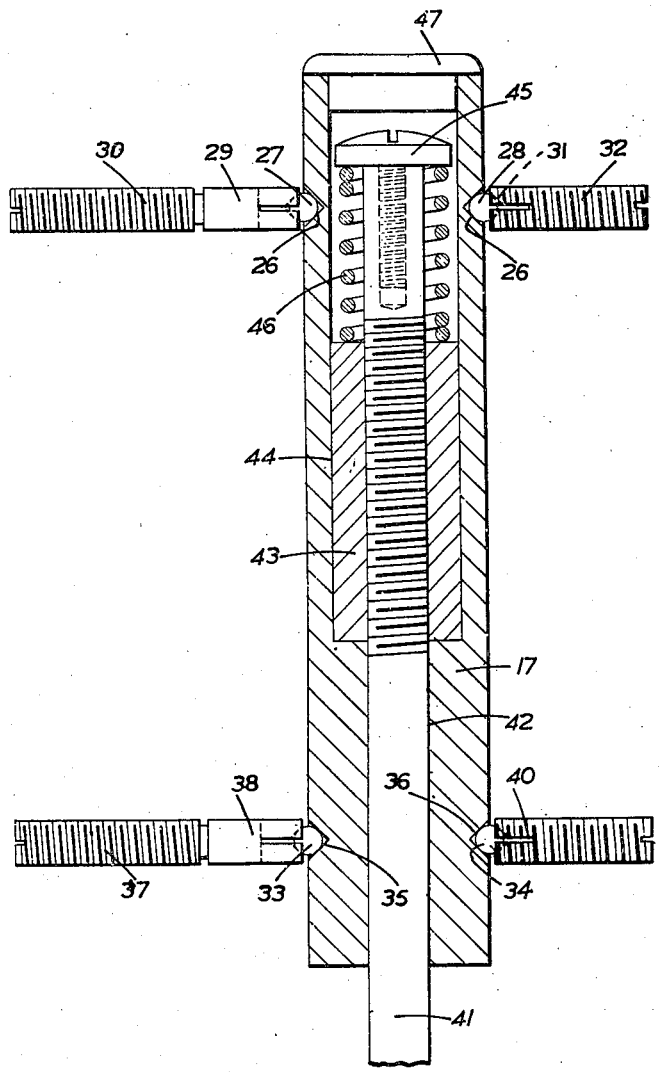

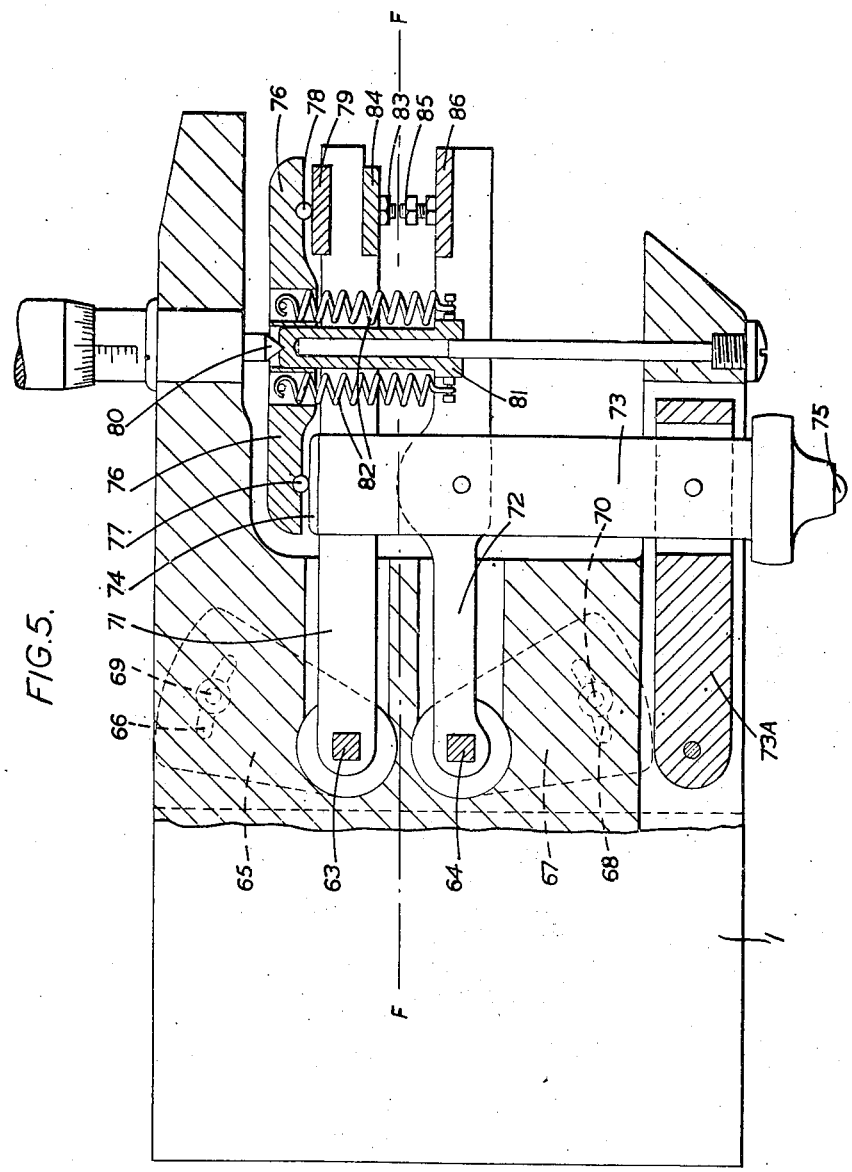

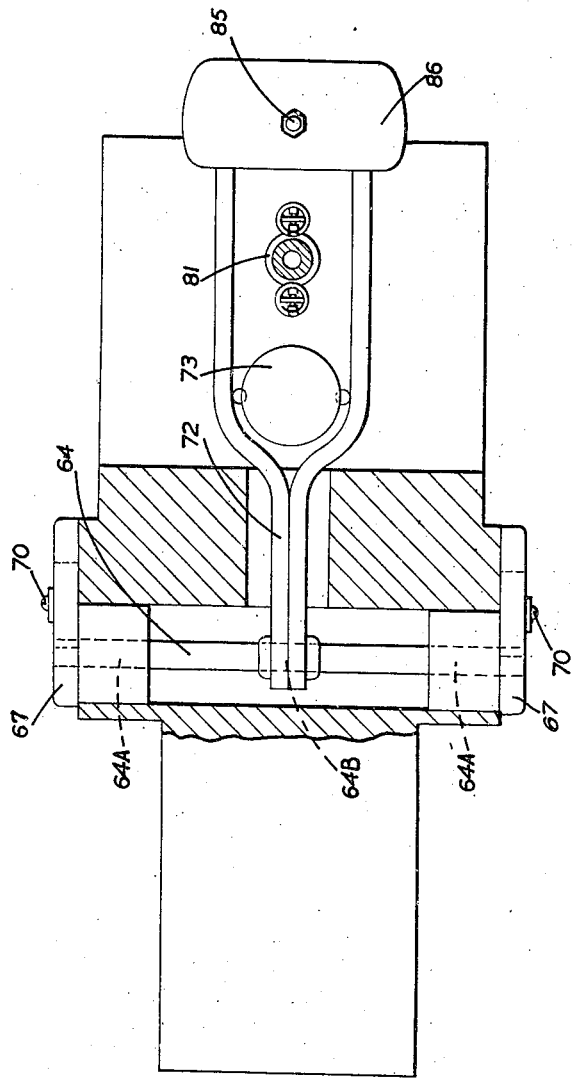

Patented Sept. 27, 1949

2,483,328

UNITED STATES PATENT OFFICE 2,483,328

SCREW ADJUSTMENT COMPARATOR

Phillip Gilbert Thomas, Leatherhead, England

Application November 13, 1943, Serial No. 510,234
In Great Britain November 25, 1942

11 Claims. (Cl. 33—170)

This invention relates to apparatus for measuring movements and particularly for measuring the dimensions of workpieces (such as gauges) or for comparing the dimensions of two or more workpieces or other members. Apparatus has been proposed in which the operation of measuring the length of a workpiece includes subjecting an elastic rod or strip to deflecting loads or stresses by means of a micrometer, and using means (such as electrical means) for indicating the deflections or movements of said rod or strip due to the loads or stresses.

Electrical detection instruments which depend upon the completion of the circuit through the workpiece suffer, however, from a defect in that the contact of the feeler device or equivalent must necessarily be of the utmost delicacy for a high degree of accuracy to be attained. This being the case, the contact is so easily disturbed by vibration, caused by passing traffic, for example, as to vitiate the usefulness of the apparatus. A further disadvantage of apparatus comprising such electrical detection means is that only workpieces which are electric conductors can be measured. Moreover, supports and such like stationary elements may be suitably designed to reduce vibration, but the moving parts of the mechanism cannot be treated in the same manner. In the case of movements of a cantilever beam, all such considerations apply with special force because every beam has a natural period of vibration.

An important object of this invention, therefore, is to overcome the above disadvantages.

According to the present invention, I provide a beam means type of apparatus for measuring movements and particularly for measuring or comparing the dimensions of workpieces or other members, means for variably loading the beam means within the elastic limit, and means for detecting when differences in the deflections of the beam means occur, characterized in that the apparatus comprises a compound beam which is made up of a number of separate beam elements, a feeler device carried by one or more of the beam elements and adapted to cooperate with the workpiece or other member, and means for operatively interconnecting the beam elements in such a manner that after cessation of deflection of the beam element, or elements, carrying the feeler device due to the contact of the device with the workpiece or other member, further deflection of the other beam element, or elements, in the stressing direction is still possible, this further deflection being utilized to furnish an indication concerning the required dimension or the required comparison of dimensions.

The apparatus preferably comprises, or is adapted to be associated with, an electrical arrangement which by detecting and indicating the completion of said further deflection thus also furnishes an indication concerning the required dimension or the required comparison of dimensions. The electrical arrangement may include two electrical contacts one carried by one beam element, or set of such elements, and the other by the other beam element, or set of such elements, the said contacts not being directly carried on the said feeler device or connected to the workpiece, and the electric circuit including means for warning the operator when the contacts are closed or opened, due to the feeler device having made contact with the workpiece.

Therefore, instead of using a simple beam, a compound beam is used. The necessary electrical contacts are disposed between elements of the compound beam and instead of relying upon extremely delicate contact of the feeler device or equivalent at the actual workpiece, pressure is built up between the feeler device or equivalent and the workpiece before the contacts operate, either to make or break the electric current, operating the detecting apparatus.

As will be understood, the apparatus may comprise any desired number of cantilever beams, or beams which are adapted to be subjected to torsional stresses.

These beams may be associated with one or more springs and the beams may be loaded through the spring or springs. In one constructional form of the invention more particularly described hereinafter, for example, two spaced parallel cantilever beams are interconnected to a single plate beam by a member supporting an axially-adjustable feeler device or measuring spindle. The apparatus also includes two other spaced parallel cantilever beams which are spaced from, and parallel to, the above mentioned beams and which support a transfer plate from which a spring-carrier member is suspended by springs. The transfer plate is adapted to bear upon the said member for supporting the axially-adjustable measuring spindle and the arrangement is such that if a load (applied for example by a micrometer spindle) is imposed on the springs through said spring-carrier, all the beams are deflected as long as the movement of the feeler device or spindle is not stopped by its contact with the workpiece. When this occurs, however, the beams carrying the transfer plate can still be deflected through the load on the springs until such time as an electrical contact carried by the beams supporting the transfer plate engages with an electrical contact carried by the beams supporting the said member and the adjustable feeler device or spindle. Thus, the latter may be applied firmly on the workpiece before the two contacts engage and any extraneous force causing vibration must be of such an amount as to overcome the damping action of such pressure, which action is considerable.

Further constructional details of the invention and a modified construction comprising beams adapted to be subjected to torsional loads will be described hereinafter.

Two constructional forms of the invention are described hereinafter, by way of example, with reference to the accompanying drawings, whereon:

Fig. 1 is a sectional side elevation of the apparatus, on the line A—A in Figure 3, part of the barrel containing the feeler device or spindle and the block carrying the top ball suspension for the barrel, however, being shown in outside elevation;

Fig. 2 is a cross section of the apparatus, partly on the line B—B in Fig. 1, and partly on the line C—C in Fig. 1;

Fig. 3 is a sectional plan view of the apparatus, the part of the figure below the line A—A being a section on the line D—D in Fig. 1, and the part of the figure above the line A—A being a section on the line E—E in Fig. 2;

Fig. 4 is a sectional view showing the method of supporting the feeler device or spindle and the ball suspensions for the barrel which carry the feeler device or spindle;

Fig. 5 is a diagrammatic sectional elevation of a modified construction wherein the beams are adapted to be subjected to torsional loads; and Fig. 6 is a sectional plan view of the apparatus, on the line F—F in Fig. 5.

Referring first to Figs. 1 to 4:

The apparatus comprises a block 1 formed with a mouth-like cavity 2 at its front end and with four accurately parallel holes which are spaced in the vertical and horizontal direction and extend from the rear of the block to the rear of the said cavity. In Fig. 1 is shown an upper rear hole 3 and a lower rear hole 4, and Fig. 3 shows the lower rear hole 4 and an upper front hole 5, the expressions "front" and "rear" being used to denote those holes which, respectively, are nearer to and further away from the side of the block 1 as viewed in Fig. 1. An end piece 6 is fixed to the rear end of the block 1, and to it are fixed the cylindrical rear ends of four circular, cantilever beams, 7, 8, 9 and 10. These beams project forwardly through the said spaced parallel holes in the block 1, and they are tapered slightly from their cylindrical rear ends to their front ends. The said spaced holes are of sufficiently large diameter to allow the beams to be deflected therein to the desired extent. Fig. 2 shows the position of all four beams. The sleeve of a micrometer 11 is fixed in a hole 12 formed in the upper jaw 13 of the block 1 on the longitudinal axis thereof. The nose 14 of the micrometer spindle is tapered and it penetrates into a hole 15 formed in a spring carrier or load transfer plate 16.

A barrel 17 projects upwardly between the jaws 13 and 18 of the block 1 through a hole 19 formed in the jaw 18 and on the longitudinal axis thereof and also through a hole formed in a flat bar or plate beam 20, the rear end of which is fixed to the end piece 6. The barrel is supported with its axis at a right angle to the beams 7, 8, 9 and 10 and 20 by means of an upper and a lower ball suspension. The upper ball suspension comprises a block 21 formed with a flat top part and with four longitudinally and transversely-spaced, split downwardly-projecting lugs 23, the front two of which are adapted to embrace an enlarged part 9A of the front lower beam 9, while the rear two lugs are adapted to embrace an enlarged part 10A of the rear lower beam 10. Headed screws 24 are used for clamping the said lugs firmly in position upon the beams 9 and 10. The top flat part of the block 21 is formed with a central hole 25, through which the barrel 17 projects. As shown more particularly in Fig. 4, diametrically-opposed tapered holes or depressions 26 are formed in the barrel 17 near the upper end thereof and in said holes are respectively seated balls 27 and 28. The ball 27 is also engaged in the split end of a split collet 29, the outer end of which is formed with a tapered hole in which is engaged the tapered end of an adjusting screw 30. The split collet and the adjusting screw are both arranged in a threaded hole formed in the top part of the block 21 and communicating with the hole 25 therein.

The ball 28 also engages in a tapered hole 31 formed in the split end of a split screw 32, which is screwed into a threaded hole formed in the top part of the block 21, diametrically opposite to the hole in which the adjusting screw 30 and the split collet 29 are arranged. Balls 33 and 34 are arranged in tapered holes or depressions 35 and 36, formed near the lower end of the barrel 17. Like the ball 27, the ball 33 is associated with an adjusting screw 37 and a split collet 38 which are arranged in a threaded hole formed in a block 39 fixed to the underside of the beam 20. The ball 34 is associated with a split screw 40 screwed into a threaded hole formed in the block 39 diametrically opposite to the hole in which the adjusting screw 37 and the split collet 38 are arranged. In conjunction with the beams 9 and 10, the beam 20 acts as a parallel linkage system to keep the barrel 17 vertical.

A feeler device or spindle 41 is closely fitted in a bore 42 formed in the lower part of the barrel 17, the upper end of the spindle being formed with a fine screw thread which is screwed into a nut 43 fixed in a bore 44 formed in the barrel 17. The top end of the spindle projects out of the nut and it is formed with a drilled and tapped hole into which is screwed the shank of a set screw having a head 45. A coil spring 46 is arranged around the spindle between the top of the nut and the head 45. The open upper end of the barrel is closed by a cap 47. The lower end of the feeler device or spindle 41 projects downwardly out of the barrel 17 and is fitted with a knurled nose 48, in the bottom of which is seated a ball 49. The ball is arranged against the bottom end of the feeler device or spindle and it projects slightly from the bottom of the nose 48.

The outer end of the transfer plate 16 is carried upon two balls 50 arranged partly in holes formed in the enlarged outer ends of the top beams 7 and 8 and partly in holes formed in the spaced, forwardly-projecting parts 51 of the said plate. The rear end of the plate is carried upon a single ball 52 which is fitted partly in a hole formed in the said cap 47 closing the top end of the barrel 17 and partly in a hole formed in the underside of the rear end of the plate 16.

The pressure of the spindle of the micrometer 11 is applied to the two top beams 7 and 8 through the transfer plate 16 by the following arrangement. The above mentioned tapered nose 14 of the micrometer spindle engages a hole formed in the top end of a hollow spring-carrier 53. At its bottom end the latter is formed with two laterally-projecting lugs 54 on to each of which one end of a coil spring 55 is hooked. The opposite end of each of the coil springs is hooked on to a pin 56 carried by the plate 16 as shown in Figs. 2 and 3. In order to guide the spring carrier in its vertical movement, the top end of a pin 57, which is screwed into the lower jaw 18 of the block 1, is engaged in the bore of the spring carrier.

An upper electrical contact 58 is fixed centrally in a bridge piece 59 of insulating material which is fixed to and extends across the underside of the spaced outer parts 51 of the transfer plate 16. The lower electrical contact 60 is adjustably carried by a metal bridge piece 61 clamped on the enlarged ends of the two lower beams 9 and 10.

The apparatus as described above is adapted to be clamped at various heights between the spaced upright cheeks, Fig. 3, of a pedestal or support by means of bolts 100 which pass through holes 101 formed in a strap 102 arranged at the back of the cheeks, the bolts 100 being screwed into tapped holes 103 in the end piece 6. When the apparatus is in use the gauge or other workpiece is arranged upon an anvil or other base or support (not shown) which is arranged below the bottom of the measuring spindle 41. The contacts 58 and 60 are connected in an electrical circuit (also not shown) which includes a source of electrical energy, such as a battery, and earphones or a loudspeaker, or other warning device.

Assuming that the dimensions of a gauge are to be compared with those of a master gauge, say a flat gauge, the latter is first arranged on the said anvil or equivalent below the feeler device or spindle 41, the apparatus being roughly adjusted, to suit the size of the gauge, upon the support 62 and then firmly clamped thereto.

The micrometer thimble is turned to any position convenient for reading (say, midway of its range) and the current is switched on in the electric circuit and through or to the contacts 58 and 60. The knurled nose 48 is then adjusted downwardly until the nose contacts the gauge and then further turning of the nose causes the barrel 17 to move upwardly. This upward movement is transmitted to the lower beams 9 and 10, and, since their inner ends are fixed, their outer ends carrying the contact 60 move upwardly to close the contacts 58 and 60. As the contacts close a click is heard in the earphones or loudspeaker, indicating that these contacts have been closed. The knurled nose 48 is then carefully adjusted in a reverse or upward direction until a second click is heard in the earphones or loud speaker, indicating that the contacts are open and whereupon a micrometer reading is noted. The apparatus is now set up and ready for actual measurement operations.

The master gauge is then replaced by the partly finished gauge and the micrometer only is adjusted until a click is heard in the earphones or loudspeaker. The reading of the micrometer is noted and the difference between the two readings is an indication of the difference between the dimensions of the two gauges and it depends upon the magnification obtained by the system of beams, and the springs 55 and the comparative strengths of the same.

It will be understood that when the micrometer is turned downwardly its nose 14 forces the spring carrier 53 downwardly, extending the springs 55 and thus through the transfer plate 16, straining the top beams 7 and 8 and, through the barrel 17 and the blocks 21 and 39, the lower beams 9 and 10 and the beam 20. As long as a workpiece does not prevent the downward movement of the feeler device or spindle, the beams 7, 8, 9 and 10 and 20 are all deflected together and, thus, in these conditions, the micrometer screw can be turned up or down throughout the whole of its range, without causing the contacts 58 and 60 to make or break the current. If, however, downward movement of the spindle 41 is stopped by the contact of the ball 49 with the workpiece, the top beams 7 and 8 can still be deflected by turning the micrometer screw. In due course the contact 58 engages the now stationary contact 60 and this electrical connection can be used to give an aural, ocular or other indication that the additional deflection of the beams 7 and 8 over that of the beams 9 and 10 has taken place.

If so desired, a ball 52a acted upon by adjustable spring pressure may be used to apply downward pressure upon the rear end of the transfer plate 16.

The modified apparatus shown diagrammatically in Figs. 5 and 6 depends for its operation upon the torsional properties of two parallel beams 63 and 64. Each of these beams is formed with squared ends engaged in square holes formed in adjusting plates 65 and 67. For example, the squared ends 64A are secured in correspondingly shaped openings in the plates 67. The plates 65 are formed with curved slots 66, and the plates 67 are formed with curved slots 68. The adjusting plates 65 are fixed on opposite sides of the block 1 by screws 69 passing through the slots 66, and the plates 67 are fixed on opposite sides of the block by screws 70 passing through the slots 68.

The rear ends of upper and lower arms 71 and 72 are fixed respectively to squared central parts, see 64B in Fig. 6, of the beams 63 and 64, centrally between adjusting plates. The rear ends of the arms extend through holes formed in the rear of the block, and their forked front ends are in superposed relationship and housed between the top and bottom jaws of the block. A barrel 73, containing a feeler device or spindle and all its associated parts as described above with reference to Figs. 1 to 4, including a cap 74 and a ball 75 is carried by ball suspensions similar to those described above, by the forked ends of the arm 72 and by an arm 73A pivotally mounted on the block 1 and acting with the arm 72 to form a parallel linkage system to keep the barrel vertical. The apparatus also comprises a transfer plate 76 supported at its inner end upon the cap 74 by a ball mounting 77 and at its outer end by two ball mountings 78, upon a bridge piece 79 of insulating material fixed across the limbs of the top arm. As in the preceding construction, the nose 80 of the micrometer spindle cooperates with the top of a hollow spring carrier 81 which is coupled to the transfer plate 76 by springs 82. An upper contact 83 is carried centrally upon a bridge piece 84 of insulating material fixed across the limbs of the top arm 71 and a lower contact 85 is carried centrally upon a bridge piece 86 of insulating material fixed across the limbs of the bottom arm 72.

Assuming that a workpiece is arranged below the ball 75 and the micrometer screw is adjusted downwards, both the arms 71 and 72 will move downwards together, respectively twisting the beams 63 and 64. If the ball 75 contacts with the workpiece, however, and the micrometer screw is still turned, only the top arm 71 will be forced downwardly and thus only the beam 63 will be further stressed. In due course, the contact 83 will engage the contact 85 and a click will be heard in the earphones or loudspeaker.

In the apparatus described above, the feeler device or spindle is disposed vertically. It will be understood, however, that the feeler device or spindle or equivalent could be arranged horizontally or at any other desired angle. It will also be understood that the apparatus can be used for measuring or comparing both internal and external dimensions such as of ring gauges, gap gauges, flat gauges, plug gauges and so on.

It will be understood that the beam elements used in any of the apparatus may be of flat plate or rods of any suitable section, and that plate beam elements may be used in combination with circular or other sectioned rod beam elements.

I claim:

1. Apparatus of the class described including, in combination, means forming a head, a first beam means, a second beam means, both said beam means having an end thereof fixed relative to each other in said head, means for variably loading both said beam means within the elastic limit of the material forming both said beam means, said means for variably loading the beam means including a bridge member carried by both said beam means and cooperatively interconnecting the same, load-applying means carried by said head and adapted to load said beam means through said bridge member, and means for detecting when the deflections of both said beam means due to the loading have reached prescribed limits, said detecting means comprising an electric circuit, contact means carried by said first beam means and contact means carried by said second beam means, said contact means being included in said circuit, a feeler device carried by said second beam means and adapted to cooperate with the workpiece, said load-applying means being adapted to load and deflect both said beam means until the deflection of said second beam means is terminated by the contact of said feeler device with the workpiece, whereafter the continued operation of said load-applying means causes the further deflection of said first beam means until said contact means engage and an indication is thereby furnished of the measurement being taken.

2. The combination set forth in claim 1, wherein said means for variably loading both said beam means includes resilient means.

3. The combination set forth in claim 1, wherein said circuit includes warning means for indicating that the continued deflection of said first beam means has been terminated and that said contact means are in contact with each other.

4. The combination set forth in claim 1 wherein said first beam means comprises a pair of spaced parallel cantilever beams, and said second beam means comprises a pair of spaced parallel cantilever beams, said feeler device being arranged at right angles to said beams, and said loading means including a micrometer for measuring the deflection of said beams.

5. Apparatus of the class described including in combination, a head, a first pair of cantilever beams fixedly secured in said head, a second pair of cantilever beams fixedly secured in said head, all of said beams being parallel in unloaded condition, a feeler device supported by said second pair of beams and adapted to contact the workpiece, said feeler device being arranged at right angles to said beams, a plate member having one end resting on the upper end of said feeler device and the opposite end supported by said first pair of beams, a loading member operatively connected to said plate member, and loading means carried by said head for applying pressure to said loading member and thereby variably loading said beams.

6. The combination set forth in claim 5 including a third cantilever beam supporting said feeler device, said third beam being parallel to said other beams when all of said beams are in unloaded condition.

7. The combination set forth in claim 5 wherein said loading member is connected to said plate member by resilient means.

8. The combination set forth in claim 5 including an electrical contact carried by and insulated from said first pair of beams, a second electrical contact carried by and insulated from said second pair of beams, and an electrical signal circuit including said contacts and adapted to be closed upon the closure of the gap between said contacts.

9. The combination set forth in claim 1 wherein said feeler device comprises a barrel member, an axially adjustable spindle carried therein, and pivotal means connecting said barrel member to said beam means.

10. Apparatus of the class described including in combination, a body member, a pair of spaced parallel beams having their ends fixed in said body, an arm fixed to each of said beams at a point intermediate the fixed ends thereof in such manner that angular movements transmitted to said arms can be transmitted to said beams, a feeler device carried by one of said arms, means carried by the other of said arms interconnecting said arms, means for variably loading both of said arms, said loading means applying the loads to said arms through said interconnecting means, said interconnecting means permitting relative movement of one of said arms with respect to the other of said arms when said feeler device contacts the workpiece, whereby with the application of loads to said arms by said loading means, both said arms will be given an angular movement to transmit torsional stresses to said beams and one of said arms will continue the angular movement when the other of said arms is prevented from further movement by the contact of the feeler device with the workpiece so as to furnish an indication of the measurement being taken.

11. The combination set forth in claim 10 including an electrical contact carried by each of said arms, an electrical indicating signal circuit including said contacts and adapted to be closed upon the closure of the gap between said contacts.

PHILLIP GILBERT THOMAS.

No references cited.